United States Patent
Loftus

(10) Patent No.: US 8,380,450 B2
(45) Date of Patent: Feb. 19, 2013

(54) DETERMINATION OF BLADE VIBRATION FREQUENCIES AND/OR AMPLITUDES

(75) Inventor: Peter Loftus, Derby (GB)

(73) Assignee: Rolls-Royce PLC, London (GB)

( * ) Notice: Subject to any disclaimer, the term of this patent is extended or adjusted under 35 U.S.C. 154(b) by 387 days.

(21) Appl. No.: 12/591,645

(22) Filed: Nov. 25, 2009

(65) Prior Publication Data

US 2010/0179775 A1 Jul. 15, 2010

(30) Foreign Application Priority Data

Jan. 9, 2009 (GB) .................................. 0900246.0

(51) Int. Cl.
*G01H 13/00* (2006.01)
(52) U.S. Cl. .............................. 702/56; 702/76; 73/579
(58) Field of Classification Search .............. 702/33–35, 702/75, 76; 73/579, 658–661
See application file for complete search history.

(56) References Cited

U.S. PATENT DOCUMENTS

| | | | | |
|---|---|---|---|---|
| 5,206,816 A | * | 4/1993 | Hill et al. ......................... | 702/56 |
| 2002/0162394 A1 | * | 11/2002 | Loftus et al. ..................... | 73/593 |
| 2008/0177485 A1 | | 7/2008 | Cohen et al. | |

FOREIGN PATENT DOCUMENTS

GB 2 374 670 A 10/2002
WO WO 2007/071912 6/2007

OTHER PUBLICATIONS

United Kingdom Search Report dated May 8, 2009 in Application No. GB0900246.0.
L. Gelman et al., "Fatigue crack diagnostics: A comparison of the use of the complex bicoherence and its magnitude", Mechanical Systems and Signal Processing, vol. 19, Issue 4, Jul. 2005, pp. 913-918.
S. Heath et al., "A Survey of Blade Tip-Timing Measurement Techniques for Turbomachinery Vibration", Journal of Engineering for Gas Turbines and Power, Oct. 1998, vol. 120, Issue 4, pp. 784-791.

* cited by examiner

*Primary Examiner* — Manuel L Barbee
(74) *Attorney, Agent, or Firm* — Oliff & Berridge, PLC

(57) ABSTRACT

A method is provided for determining vibration frequencies of rotating blades mounted on a rotor which rotates relative to and is supported by a rotor support structure. The method includes the steps of:
 (a) determining possible vibration frequencies of the blade from blade displacements corresponding to the times at which a blade passes a stationary timing probe;
 (b) converting a vibration signal detectable at the support structure into a vibration frequency spectrum; and
 (c) identifying the blade vibration frequency by matching a peak in the vibration frequency spectrum with one of the possible blade vibration frequencies.

13 Claims, 1 Drawing Sheet

DETERMINATION OF BLADE VIBRATION FREQUENCIES AND/OR AMPLITUDES

Figure 1:
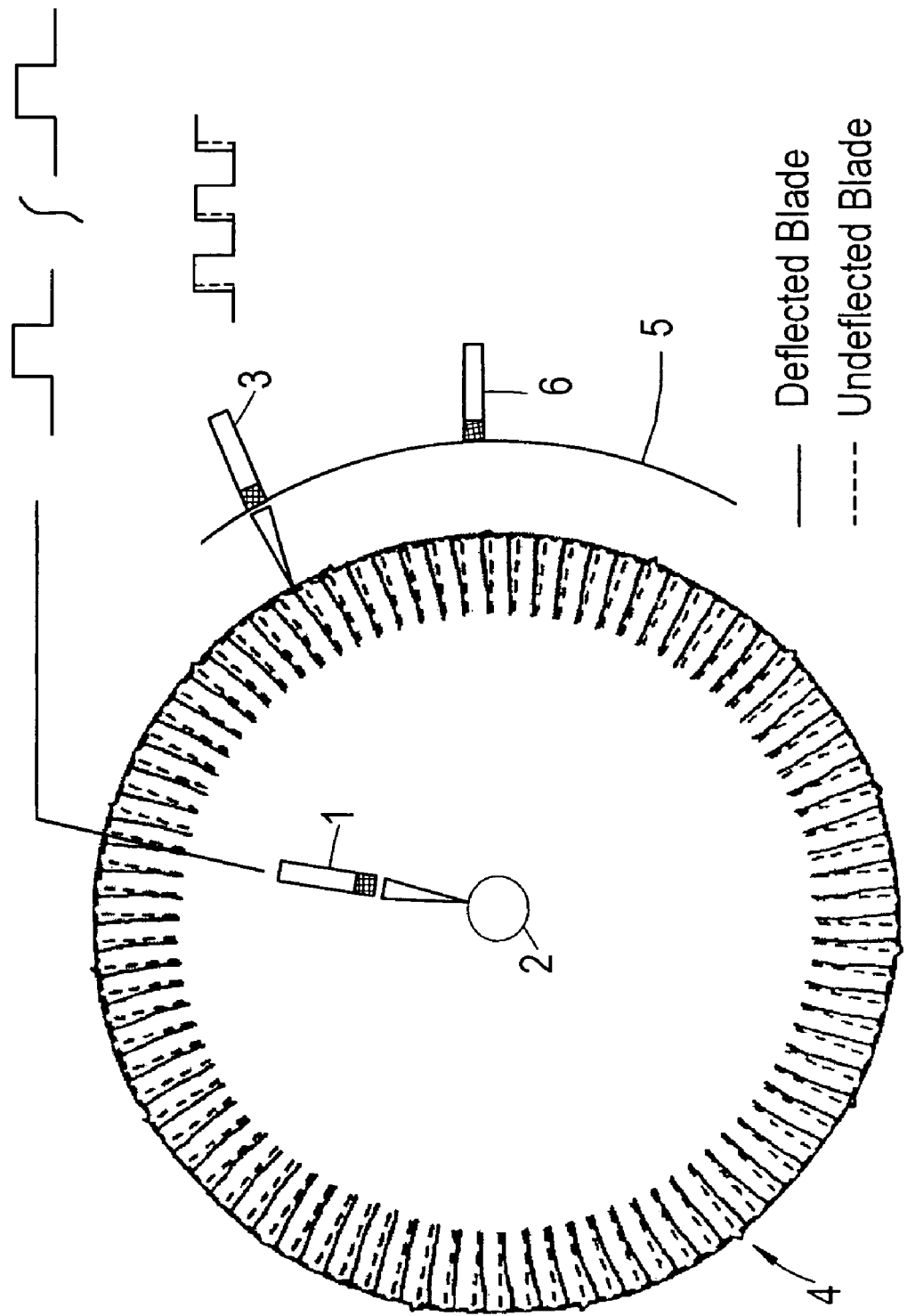

The present invention relates to a method of determining vibration frequencies and/or amplitudes of rotating blades mounted on a rotor which rotates relative to and is supported by a rotor support structure.

In the development of gas turbine engines, it is often important to determine the amount of vibration of the rotating blades. From vibration measurements, stresses induced in the blades may be determined. Action can then be taken to avoid stresses which are high enough to cause damage to the blades.

It is known, for example, to mount strain gauges on rotating compressor/turbine blades to provide information about the amplitudes and frequencies of vibration of the blades. One or more strain gauges can be provided on each blade, and connected to a radio telemetry system mounted on the rotor, which transmits the measurements from the rotor. However, due to the number of strain gauges required to fully determine the vibrations, the telemetry system is typically complex, expensive, large and time-consuming to install within the rotor.

Another approach for detecting blade vibration, and changes in blade vibration caused by cracking, senses vibrations transmitted through the bearings of the engine and measured on the engine casing. For example, WO 2007/071912 proposes determining the presence of a crack using the bicoherence to quantify the extent of phase coupling in a vibration signal. However, unknown and variable transfer functions introduced by the bearings can mean that, while some frequency information is preserved, the amplitude of vibration can be difficult to establish (see, for example, L. Gelman et al., Mechanical Systems and Signal Processing, Vol. 19, Issue 4, July 2005, pp. 913-918).

An alternative technique for characterising blade rotation is "blade tip timing" (BTT) in which non-contact timing probes, typically mounted on the engine casing, are used to measure the time at which a blade passes each probe. This time is compared with the time at which the blade would have passed the probe if it had been undergoing no vibration. This is termed the "expected arrival time" and can be calculated from the rotational position of the particular blade on the rotor in conjunction with a "once per revolution" or "OPR" signal which provides information about the position of the rotor. The OPR signal is derived from the time at which an indicator on the rotor passes a reference sensor, and its use is well known in the art.

The difference between the expected arrival time and the actual arrival time can be multiplied by the blade tip velocity to give the displacement of the blade from its expected position. Thus BTT data from a particular probe effectively measures blade tip displacement at the probe.

Advantageously, the tip timing method does not require a telemetry system since the probes are mounted on the casing.

However, because the sampling rate of the probes is determined by the rotational frequency of the rotor, it is often below the Nyquist frequency for the vibrations of interest. Thus each probe undersamples the vibrations, leading to problems such as aliasing. A further problem with the BTT approach is that multiple probes are inconvenient in engine testing, and may be impractical in service.

In general terms, the present invention provides a method of determining vibration frequencies and/or amplitudes of rotating blades which combines blade displacements, e.g. obtained from a BTT probe, with a vibration signal detectable at a rotor bearing support structure. Information in the vibration signal can address the problem of undersampling by a BTT probe.

Thus a first aspect of the invention provides a method of determining vibration frequencies of rotating blades mounted on a rotor which rotates relative to and is supported by a rotor support structure, the method including the steps of:

(a) determining possible vibration frequencies of a blade from blade displacements corresponding to the times at which the blade passes a stationary timing probe;

(b) converting a vibration signal detectable at the support structure into a vibration frequency spectrum; and (c) identifying the blade vibration frequency by matching a peak in the vibration frequency spectrum with one of the possible blade vibration frequencies.

The vibration signal detectable at the support structure is influenced by the blade vibrations, as these can be transmitted to the support structure via the rotor and e.g. the rotor bearings. Thus frequency information extractable from the vibration signal can be used to identify the blade vibration frequency.

Preferably, the method further includes the step of:

(d) determining the amplitude of the identified blade vibration frequency from the blade displacements.

Generally, it is possible to determine blade vibration amplitudes from displacement data obtained from only a single timing probe. Conversely, blade vibration amplitudes can be difficult to determine from the vibration signal detectable at the support structure. Thus, advantageously, the method can make use of the respective strengths of the BTT approach (amplitude determination) and the transmitted vibration approach (frequency identification).

The determination of possible vibration frequencies in step (a) (and optionally the determination of the amplitude of the identified blade vibration frequency in step (d)) method may be based on blade displacements corresponding to the times at which the blade passes a plurality of stationary timing probes. However, preferably only one stationary timing probe is used, as this reduces the weight, cost and complexity of the installed probes, making the method more attractive for use in both test phases and in-service.

A plurality of vibration signals may be detectable at the support structure in step (b) and converted into respective vibration frequency spectra. Although detecting more than one vibration signal can add to the complexity of the detection equipment, an advantage of having more than one vibration frequency spectrum is that they can resolve ambiguities which might otherwise arise in step (c) when matching peaks in the vibration frequency spectra with the possible blade vibration frequencies.

Preferably step (a) includes the sub-steps of:

converting the blade displacements into a displacement frequency spectrum;

identifying one or more peaks in the displacement frequency spectrum; and determining possible blade vibration frequencies by adding and/or subtracting multiples of the rotational frequency of the rotor to the frequencies of the identified peaks. In this way possible blade vibration frequencies corresponding to respective and predetermined engine orders can be determined.

Preferably step (a) further includes the sub-step of:

comparing the possible blade vibration frequencies with a model of blade vibration to reject possible blade vibration frequencies that do not correspond with predicted blade vibrational modes. Thus the comparing sub-step can act as a filter allowing only those blade vibration frequencies which are likely to exist in practice to proceed to step (c).

A second aspect of the invention provides a method of determining vibration amplitudes of rotating blades mounted on a rotor which rotates relative to and is supported by a rotor support structure, the method including the steps of:

(a) providing blade displacements corresponding to the times at which a blade passes a stationary timing probe, (b) converting a vibration signal detectable at the support structure into a vibration frequency spectrum, (c) identifying a blade vibration frequency from a peak in the vibration frequency spectrum, (d) determining an alias frequency of the blade vibration frequency from the rotational speed of the rotor such that the alias frequency is exhibited by the blade displacements, and (e) determining the amplitude of the blade displacements at the alias frequency, said amplitude corresponding to the amplitude of the blade vibration at the blade vibration frequency.

This method is particularly useful when a peak in the vibration frequency spectrum can be used to identify a blade vibration frequency without reference to blade displacements measured by a timing probe. Such circumstances can arise, for example, when vibrations detectable at the support structure, other than those originating from blade vibrations, are insignificant or filterable. Further, knowing the rotational speed of the rotor allows the corresponding alias frequency of the identified frequency in the blade displacements to be determined. There is thus no need to investigate a plurality of possible blade vibration frequencies. Also, although the blade vibration frequency is aliased in the blade displacements, the amplitude of the displacements at the alias frequency still corresponds to the amplitude of the blade vibration at the blade vibration frequency.

In the first or the second aspect, typically the rotor is a component of a gas turbine engine. However, the rotor can also be, for example, a centrifugal impeller, an impeller or turbine of a turbocharger, a gear wheel, or other bladed rotating component.

The method of the first or second aspect may further include the initial step of providing the stationary timing probe and measuring the blade displacements using the stationary timing probe. Additionally, or alternatively, the method may further include the initial step of detecting the vibration signal using a vibration sensor mounted to or in mechanical contact with the support structure.

In the first or the second aspect, blade displacements may be provided in step (a), for example if it is known or suspected that the vibrations of the blades are substantially equal.

Third, fourth and fifth aspects of the present invention respectively provide a computer-based system for performing the method of the first or second aspect, a computer program for performing the method of the first or second aspect, and a computer program product carrying a program for performing the method of the first or second aspect. The computer system may have, for example, any one or combination of: an input device or devices for receiving the blade displacements and the vibration signal, a memory device or devices for storing the blade displacements and the vibration signal, a processor or processors for converting the vibration signal and identifying the blade vibration frequency, and a display and/or output device for displaying the identified blade vibration frequency.

A sixth aspect of the present invention provides a system for determining vibration frequencies of rotating blades mounted on a rotor which rotates relative to and is supported by a rotor support structure, the system including:

the computer-based system of the third aspect;

a stationary timing probe for measuring the blade displacements; and a vibration sensor for detecting the vibration signal.

Embodiments of the invention will now be described by way of example with reference to the accompanying drawings in which:

FIG. 1 shows schematically a BTT arrangement.

FIG. 1 shows schematically a BTT arrangement. An OPR probe 1 monitors the position of a rotor 2 of a gas turbine engine, while a BTT probe 3 fixed to an engine casing 5 provides timings for blades 4 mounted to the rotor. An accelerometer 6 is also mounted on the casing in mechanical contact with and close to a support structure of the rotor, i.e. at the support for the rotor bearings. Vibration accelerations measured by the accelerometer include vibrations transmitted to the casing from the blade via the rotor, bearings and support structure.

Only one BTT probe 3 is shown in FIG. 1. The approach of the present invention can be expanded to accommodate timings measured by other BTT probes fixed to the engine casing 5. However, an advantage of the present invention is that it can be applied to determine blade vibration frequencies even if only one BTT probe is used or available. By using just one BTT probe, many of the barriers to wider adoption of the BTT technique can be overcome.

Conditioning circuitry familiar to the skilled person converts the pulses from BTT probe 3 into displacement values representing the instantaneous displacements of blade tips under the probe as a result of vibration. More specifically, "expected arrival times" for the blades at the BTT probe are calculated from an OPR signal measured by the OPR probe 1, the expected arrival times being the times at which the blades would have passed the probe if they had been undergoing no vibration. The actual timings measured by the BTT probe are compared with the expected arrival times, the differences between the expected arrival times and the actual timings being multiplied by the blade tip velocities to give the displacements of the blades from their expected positions. The blade displacements are gated to separate out the displacements of individual blades.

The series of displacement values for a blade are then Fourier transformed to produce a displacement frequency spectrum. Optionally, the displacement values from a plurality of blades may be combined in the Fourier transform, for example if it is known or suspected that the vibrations of the blades are substantially equal. The most significant spectral peak or peaks in the displacement spectrum are identified. These peaks should correspond to the main blade vibration mode(s). However, as the blade vibration is generally undersampled by the BTT probe, the frequency of each identified peak is aliased by the rotor speed. Thus possible vibration frequencies for the blade are provided by the expression $f = f_m \pm \phi f_n$, where f is a possible blade vibration frequency, $f_m$ is a frequency of an identified peak, $\phi$ is an integer defining the alias order, and $f_n$ is the rotation frequency of the rotor.

Typically, $\phi$ is selected to provide possible blade vibration frequencies which correspond to engine orders from 1 up to 20. For example, if the rotor is rotating at 50 Hz and a peak is identified at frequency of 145 Hz, then setting $\phi = -2, -1, 0, 1, 2 \ldots 17$ provides 20 possible blade vibration frequencies at 45 Hz, 95 Hz ... 995 Hz respectively corresponding to engine orders 1 to 20.

The possible blade vibration frequencies may be verified by comparison with a numerical model of the vibrating blade to confirm that one or more of the orders correspond, at least approximately, to predicted vibration modes. Possible blade vibration frequencies that do not correspond can be rejected at this point. The model typically includes a finite element representation of the blade structure together with means to estimate damping.

Next, the vibratory accelerations detected by the accelerometer 6 is used to identify the actual blade vibration frequency from the possible blade vibration frequencies.

The vibratory accelerations are Fourier transformed to produce a vibration frequency spectrum for the casing 5. This spectrum is inspected for peaks at the remaining possible blade vibration frequencies. Because at least some of the vibrations measured by the accelerometer 6 derive from the blade, a peak in the vibration spectrum aligning with a possible blade vibration frequency verifies that an actual vibration frequency of the blade is at that frequency. This alignment may be achieved by creating windows in the spectrum where the BTT analysis predicts a possible frequency, then setting an acceptance threshold for the accelerometer data in these windows.

Sometimes there may be no clear correspondence between the possible blade vibration frequencies and the peaks in the vibration frequency spectrum, e.g. because a number of vibration sources contribute to the vibratory accelerations detected by the accelerometer 6. In such circumstances, ambiguities may be resolved by repeating the comparison between the possible blade vibration frequencies and the vibration frequency spectrum for different rotor speeds. Alternatively or additionally, the vibration frequency spectrum may be weighted to emphasise those frequencies associated with higher bicoherence, or using other established signal processing schemes.

Having identified the blade vibration frequency, the amplitude of that frequency can be determined from the blade displacements using techniques known to the skilled person. Even if displacements from only a single probe 3 are available, this can be sufficient to determine the amplitude of the blade vibration (see, for example, S. Heath et al., Journal of Engineering for Gas Turbines and Power, October 1998, Vol. 120, Issue 4, p. 784).

Similar analyses of vibration frequency, and optionally vibration amplitude, can be performed for other of the blades. If more BTT probes are available, the displacement values obtained from those probes can also be analysed. Having more probes can improve the accuracy of the amplitude determination and reduce the number of possible blade vibration frequencies.

Under some circumstances, the Fourier transformed vibratory accelerations detected by the accelerometer 6 can be used to identify the actual blade vibration frequency directly, i.e. without recourse to the blade displacement values. For example, vibrations detectable at the support structure, other than those originating from blade vibrations, may be insignificant or filterable. The blade vibration frequency may then be the significant peak in the vibration frequency spectrum.

The corresponding alias frequency exhibited by the blade displacements for that vibration frequency can be calculated from the rotational speed of the rotor, and the amplitude of the blade displacements at the alias frequency determined using techniques known to the skilled person. As the aliasing does not effect the vibrational amplitudes, this amplitude thus corresponds to the amplitude of the blade vibration at the identified blade vibration frequency.

Further accelerometers may also be mounted on the casing or at other positions in mechanical contact with the support structure of the rotor. The vibration accelerations measured by these accelerometers can also be converted into vibration frequency spectra, and used to supplement the original vibration frequency spectrum when seeking matches with the possible blade vibration frequencies. For example, the relative amplitude and phase of these signals can carry information about the location of the source of the vibration, and may be used to help locate the blade row. Alternatively, or additionally, the data from multiple accelerometers may be averaged to reduce noise.

Advantageously, the approach of the present invention can be performed using sensors which are relatively easy to install, robust, low weight and low cost, and accessible for maintenance. Thus the approach can be used in both the test phase of engine development and in-service.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of determining vibration frequencies of rotating blades mounted on a rotor which rotates relative to and is supported by a rotor support structure, the method comprising:
   (a) determining, using a stationary timing probe, possible blade vibration frequencies of a blade from blade displacements corresponding to times at which the blade passes the stationary timing probe;
   (b) converting a vibration signal detectable at the rotor support structure into a vibration frequency spectrum; and
   (c) identifying a blade vibration frequency by matching a peak in the vibration frequency spectrum with one of the possible blade vibration frequencies.

2. A method according to claim 1, wherein step (a) further comprises:
   converting the blade displacements into a displacement frequency spectrum;
   identifying one or more peaks in the displacement frequency spectrum; and
   determining the possible blade vibration frequencies by adding and/or subtracting multiples of a rotational frequency of the rotor to frequencies of the identified peaks.

3. A method according to claim 2, wherein step (a) further comprises:
   comparing the possible blade vibration frequencies with a model of blade vibration to reject possible blade vibration frequencies that do not correspond with predicted blade vibrational modes.

4. A method according to claim 3, further comprising:
   determining an amplitude of the identified blade vibration frequency from the blade displacements.

5. A method according to claim 2, further comprising:
   determining an amplitude of the identified blade vibration frequency from the blade displacements.

6. A method according to claim 1, further comprising:
   (d) determining an amplitude of the identified blade vibration frequency from the blade displacements.

7. A method according to claim 1, wherein the rotor is a component of a gas turbine engine.

8. A method according to claim 1, further comprising:
   initially providing the stationary timing probe and measuring the blade displacements using the stationary timing probe.

9. A method according to claim 1, further comprising:
initially detecting the vibration signal using a vibration sensor mounted to or in mechanical contact with the rotor support structure.

10. A computer-based system for performing the method of claim 1.

11. A system for determining the vibration frequencies and/or vibration amplitudes of the rotating blades mounted on the rotor which rotates relative to and is supported by the rotor support structure, the system including:
the computer-based system of claim 10;
the stationary timing probe for measuring the blade displacements; and
a vibration sensor for detecting the vibration signal.

12. A non-transitory computer readable medium containing computer instructions, which when executed, cause a computer to perform the method of claim 1.

13. A method of determining vibration amplitudes of rotating blades mounted on a rotor which rotates relative to and is supported by a rotor support structure, the method comprising:
(a) providing, using a stationary timing probe, blade displacements corresponding to times at which a blade passes the stationary timing probe,
(b) converting a vibration signal detectable at the rotor support structure into a vibration frequency spectrum,
(c) identifying a blade vibration frequency from a peak in the vibration frequency spectrum,
(d) determining an alias frequency of the blade vibration frequency from a rotational speed of the rotor such that the alias frequency is exhibited by the blade displacements, and
(e) determining an amplitude of the blade displacements at the alias frequency, the amplitude corresponding to an amplitude of a blade vibration at the blade vibration frequency.

* * * * *